United States Patent
Brockhaus et al.

(10) Patent No.: US 11,232,233 B2
(45) Date of Patent: Jan. 25, 2022

(54) METHOD FOR CONFIGURATION OF A FIELD DEVICE FOR USE IN CUSTODY TRANSFER AND SUCH FIELD DEVICE

(71) Applicant: KROHNE Messtechnik GmbH, Duisburg (DE)

(72) Inventors: Helmut Brockhaus, Oberhausen (DE); Johannes Kunze, Bochum (DE); Nicolaus Mathies, Moers (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 0 days.

(21) Appl. No.: 15/603,551

(22) Filed: May 24, 2017

(65) Prior Publication Data
US 2017/0344751 A1 Nov. 30, 2017

(30) Foreign Application Priority Data
May 24, 2016 (DE) .................. 10 2016 109 598.2

(51) Int. Cl.
*G06F 21/62* (2013.01)
*G06F 21/60* (2013.01)
(Continued)

(52) U.S. Cl.
CPC ....... *G06F 21/629* (2013.01); *G05B 19/0426* (2013.01); *G06F 21/604* (2013.01); *G01G 23/017* (2013.01)

(58) Field of Classification Search
CPC .... G06F 21/629; G06F 21/86; G06F 21/6218; G06F 2221/2141; G06F 21/604;
(Continued)

(56) References Cited

U.S. PATENT DOCUMENTS 8,340,791 B2 * 12/2012 Schulte .............. G05B 23/0221
  700/71
2,919,914 A1 * 8/2013 Fink ..................... G06F 21/86
(Continued)

FOREIGN PATENT DOCUMENTS

CA       2 919 914 A1    2/2015
DE    102012213155 A1 *  2/2014 ............. G06F 21/74

OTHER PUBLICATIONS

SC100_200, SC100_200 Series, May 2103, https://www.m-system.co.jp/mssenglish/PDF/EM/S/emsfew3e_c.pdf, pp. 1-102.*

*Primary Examiner* — Farid Homayounmehr
*Assistant Examiner* — Suman Debnath
(74) *Attorney, Agent, or Firm* — David S. Safran; Roberts Calderon Safran & Cole, P.C.

(57) ABSTRACT

A method for configuring a field device for use in custody transfer and such a field device, wherein the field device has a computing unit and a storage, wherein parameters and/or functions are stored in the storage, and wherein the parameters and/or functions are at least partially configurable. A more flexible configuration of the field device used for custody transfer is achieved by at least two blocking groups being provided, wherein each blocking group comprises at least one parameter and/or at least one function of the field device, at least one blocking group is chosen and evaluated by the computing unit, and the computing unit blocking the parameters and/or functions contained in the chosen at least one blocking group against a subsequent change.

8 Claims, 2 Drawing Sheets

(51) Int. Cl.
*G05B 19/042* (2006.01)
*G01G 23/01* (2006.01)

(58) Field of Classification Search
CPC .............. G05B 19/418; G05B 19/0425; G05B 2219/25428; G05B 2219/31104; G05B 19/0426; G05B 19/048; H04L 63/20; H04L 63/065; H04W 48/02; G01G 23/017
USPC ............................................. 726/26; 709/225
See application file for complete search history.

(56) References Cited

U.S. PATENT DOCUMENTS

| | | | |
|---|---|---|---|
| 9,141,106 B2 * | 9/2015 | De Groot | G05B 19/0425 |
| 9,432,402 B1 * | 8/2016 | McKeeman | G06F 16/13 |
| 9,871,775 B2 * | 1/2018 | Biggs | H04L 9/0833 |
| 2008/0148296 A1 * | 6/2008 | Chen | G05B 19/4186 |
| | | | 719/328 |
| 2012/0004743 A1 * | 1/2012 | Anne | G05B 19/409 |
| | | | 700/83 |
| 2016/0124501 A1 * | 5/2016 | Lam | G02B 27/017 |
| | | | 345/156 |
| 2016/0203344 A1 * | 7/2016 | Fink | G06F 21/86 |
| | | | 726/26 |
| 2016/0313173 A1 * | 10/2016 | Krolak | G01F 25/0061 |
| 2017/0082480 A1 * | 3/2017 | Sai | G01F 25/0007 |
| 2018/0107230 A1 * | 4/2018 | Sai | G05B 19/048 |
| 2018/0278628 A1 * | 9/2018 | Kumar Kn | H04L 63/1416 |

* cited by examiner

| Sensor | X |
|---|---|
| I/O A | |
| I/O B | |
| SIL | X |
| Display | X |
| ... | |

| Sensor | X |
|---|---|
| I/O A | |
| I/O B | |
| SIL | X |
| Display | X |
| ... | |

METHOD FOR CONFIGURATION OF A FIELD DEVICE FOR USE IN CUSTODY TRANSFER AND SUCH FIELD DEVICE

BACKGROUND OF THE INVENTION

Field of the Invention

The invention relates to a method for the configuration of a field device for use in custody transfer, wherein the field device has a computing unit and a storage, wherein parameters and/or functions are stored in the storage, wherein the parameters and/or functions are at least partially configurable. Furthermore, the invention also relates to such a field device, i.e., a field device for use in custody transfer.

Description of Related Art

Methods for the configuration of field devices for use in custody transfer and field devices for use in custody transfer are known in many variations in the prior art. These types of field devices are normally measuring devices that are installed in a physical-technical process, for example, in an industrial production plant. These field devices are, for example, flowmeters, pressure meters, analytical measuring equipment or the like.

Special conditions are required in flowmeters for use in custody transfer, in particular because fair trade needs to be ensured or because measuring accuracy is a benefit to the public, for example, often due to a quantity-based tax being raised on the transported and extracted medium.

Custody transfer flow measurements are subject to a plurality of legal and institutional regulations, through which a particular certainty of the measurements is ensured. For example, regulations of the International Organization of Legal Metrology (Organisation Internationale de Métrologie Légale (OIML)), here, for example, the OIML Certificate R 117 for measuring systems of liquids other than water. Recommendations of the OIML are often incorporated into national standards and, thus, are held in regard world-wide. A European guideline addressing the requirements for authorizing a measuring device for use in custody transfer is the guideline 2004/22/EG of the European Union.

A central characteristic of flowmeters for use in custody transfer is its tamper protection. It should be ruled out with great probability that a flowmeter for use in custody transfer can be tampered with from outside in such a manner that its measuring accuracy is no longer ensured or, respectively, that the measurement is falsified. This could take place in that, for example, calibration parameters set by an official inspection authority and stored in the flowmeter are overwritten. Such a tampering is by all means to be prevented in the respect that a tampering with technical means is made more complicated and that successful tampering is clearly recognizable.

It is known that the opening of flowmeters or the housings of these flowmeters is prevented using a seal, so that influencing the flowmeter is made possible first when the seal is broken and, thus, is detectable. Modern flowmeters can often no longer be easily opened, for example, due to provided explosion protection measures.

Before a manipulation of the field device is prevented using the above-described measures, it is, however, possible to configure the field device, for example, in that the custody transfer parameters required directly for measurement are stored in the field device, the interfaces of the field device are configured or the local display is configured. Thus, in general, all parameters and functions that influence the measurement functions relevant for custody transfer (e.g., calibration data, simulation functions) or that have an effect on the output of the measured values relevant for custody transfer (e.g., configuration of the I/O interfaces or the local display) are to be protected before any subsequent changes.

It is known from the prior art that, after termination of the configuration of parameters and/or functions of the field device, all parameters and/or functions related to custody transfer are blocked against further influence—often by custody transfer officers—, i.e., the superset of all parameters and/or functions of the field device required in every conceivable case for custody transfer are protected. It has been seen that handling the protection of custody transfer parameters and/or functions in this manner is very inflexible and, in part, disadvantageous for the use of such field devices.

SUMMARY OF THE INVENTION

It is, thus, the object of the present invention to provide a method for configuration of a field device for use in custody transfer mentioned in the introduction and the respective field device in such a manner that a more flexible configuration of parameters and/or functions is made possible.

The above derived and described object is achieved with the method described in the introduction in that at least two blocking groups are provided, wherein each blocking group comprises at least one parameter and/or at least one function of the field device, that at least one blocking group is chosen, that the chosen blocking groups are evaluated by the computing unit, and that the computing unit blocks the parameters and/or functions contained in the chosen blocking groups against a subsequent change.

By providing several blocking groups, it is fundamentally possible to create different choices of parameters and/or functions of the field device, so that, consequently, blocking groups exist with different assignments of parameters and/or functions. Thereby, it is possible to assign a parameter and/or a function of the field device to more than one blocking group. By providing several blocking groups with different choices of parameters and/or functions of custody transfer, a high measure of flexibility is created for configuring a field device used in custody transfer. It is no longer necessary to block all parameters and/or functions related to custody transfer—i.e., all conceivable in the field device—, in fact, it is possible with the shown method to secure a selection of parameters and/or functions for custody transfer against manipulation occurring after blocking. The other parameters and/or functions that do not have to be blocked for custody transfer can, then, also be subsequently influenced and configured.

After choosing one or even several blocking groups, an evaluation of the chosen blocking groups takes place by the computing unit, so that the choice made overall for all parameters to be blocked and/or for all functions to be blocked is known. As soon as a parameter and/or a function appears in just one chosen blocking group, this parameter and/or this function is blocked against subsequent change. The computing unit, which is accordingly programmed, is, in turn, responsible for blocking the parameters and/or functions contained in the chosen blocking groups.

According to a preferred implementation of the method according to the invention, it is provided that the blocking groups are provided in the storage of the field device or the blocking groups are provided in the storage of a control unit to be connected to the field device. In the first case, the selection from the provided blocking groups normally takes place via the display of the field device. In the second case, the selection of blocking groups from the provided blocking groups takes place via the display of a control unit attached to the field device. Alternatively, the field device can receive information about the provided blocking groups from the external control unit. For the case that all of the provided blocking groups are provided in the storage of the field device, it is also possible that this information is transmitted to a connected control unit and a selection of blocking groups—or only one blocking group—takes place via the control unit. As a result, this means that, according to a preferred implementation of the invention, the blocking groups can be chosen to be displayed by a display of the field device or by a display of a control unit to be connected to the field device.

According to an advantageous further development of the method according to the invention or the field device according to the invention, it is provided that the computing unit evaluates the state of a blocking element of the field device and the computing unit first blocks the parameters and/or functions contained in the chosen blocking groups against a subsequent change in a defined blocking state of the blocking element. Such a blocking element can be, for example, a switch—or several switches—arranged in the field device, which is/are placed into a certain position (blocking position/non-blocking position) for indicating blocking or non-blocking. In this case, the position of the switch is evaluated by the computing unit of the field device.

According to a preferred implementation, it is further provided that the computing unit also blocks a change of the chosen blocking groups after acknowledging the blocking state of the blocking element. Thus, it is also prevented that the ability to influence a parameter of the field device that is actually to be blocked or a function that is actually to be blocked is influenced by a previous, indirect action, namely the selection of the blocking group.

Preferably, the method for the configuration of a field device or the field device for use in custody transfer is designed in such a manner that the blocking groups are organized according to functional criteria, namely that at least one blocking group, which comprises the parameters and/or functions of one of the following areas: display, sensor, I/O interface, safety functions, is among the blocking groups to be chosen. Such an organization of the blocking groups makes, in particular, a functional-selective configuration of the subsequent ability to influence or inability to influence the parameters and/or functions of the field device possible.

In many applications, usually only a part of the I/O interfaces or the local display of the field is used in the custody transfer application of interest, so that there is no reason to not subsequently influence the other parameters and/or functions of the field device. Depending on the field of use in custody transfer, different I/O interfaces have to be permanently manipulation-safe after setting the blocking element, and for example, a calibration seal. For this, it is now possible depending on the field of use, to block different parameters and/or functions against subsequent change. If, for example, in the case of a water meter, only the display used for proper billing is a custody transfer function of the field device, it is possible to add custody transfer functions that are to be secured against subsequent manipulation in other applications. This can be the case, for example, when the measured value of the field device is to be output externally via I/O interfaces, which makes a blocking of the respective I/O interfaces necessary.

The above described and derived object is achieved by the respective field device for use in custody transfer in that at least two blocking groups to be chosen are provided in the storage, wherein each blocking group comprises at least one parameter and/or at least one function of the field device, wherein the computing unit is programmed so that, after choosing at least one blocking group, the chosen blocking groups are evaluated by the computing unit and the computing unit blocks the parameters and/or functions contained in the chosen blocking groups against a subsequent change.

Overall, the field device is programmed so that it is capable of carrying out the aspects of the method described above for configuration of a field device for use in custody transfer. This means that the field device, in its different implementations and further developments, is characterized in that that the blocking groups are provided in the storage of the field device or the blocking groups are provided in a storage of a control unit to be connected to the field device, that the blocking groups can be chosen to be displayed by a display of the field device or by a display of a control unit that can be connected to the field device, that the computing unit evaluates the state of a blocking element of the field device and the computing unit first blocks the parameters and/or functions contained in the chosen blocking groups against a subsequent change in a defined blocking state of the blocking element, that the computing unit also blocks a change of the chosen blocking groups after acknowledging the blocking state of the blocking element, that the blocking groups are organized according to functional criteria, that at least one blocking group, which comprises the parameters and/or functions of one of the following areas: display, sensor, I/O-interface, safety functions, is among the blocking groups to be chosen, and that several blocking groups are combined in at least one higher-level blocking group and all blocking groups that are combined in the higher-level blocking group are chosen by choosing the higher-level blocking group.

The above features can stand alone or can be combined.

In detail, there is a plurality of possibilities for designing and further developing the method according to the invention or, respectively, the field device according to the invention for custody transfer as will be apparent from the following description together with the accompanying drawings.

BRIEF DESCRIPTION OF THE DRAWINGS

FIG. 1 is a method shown schematically for configuration of a field device for use in custody transfer as well as a respective field device and FIG. 2a is a representation of provided and selectable blocking groups in the display of a field device and FIG. 2b is a representation of the blocking groups in a control unit connected to the field device.

DETAILED DESCRIPTION OF THE INVENTION

Figure 1:
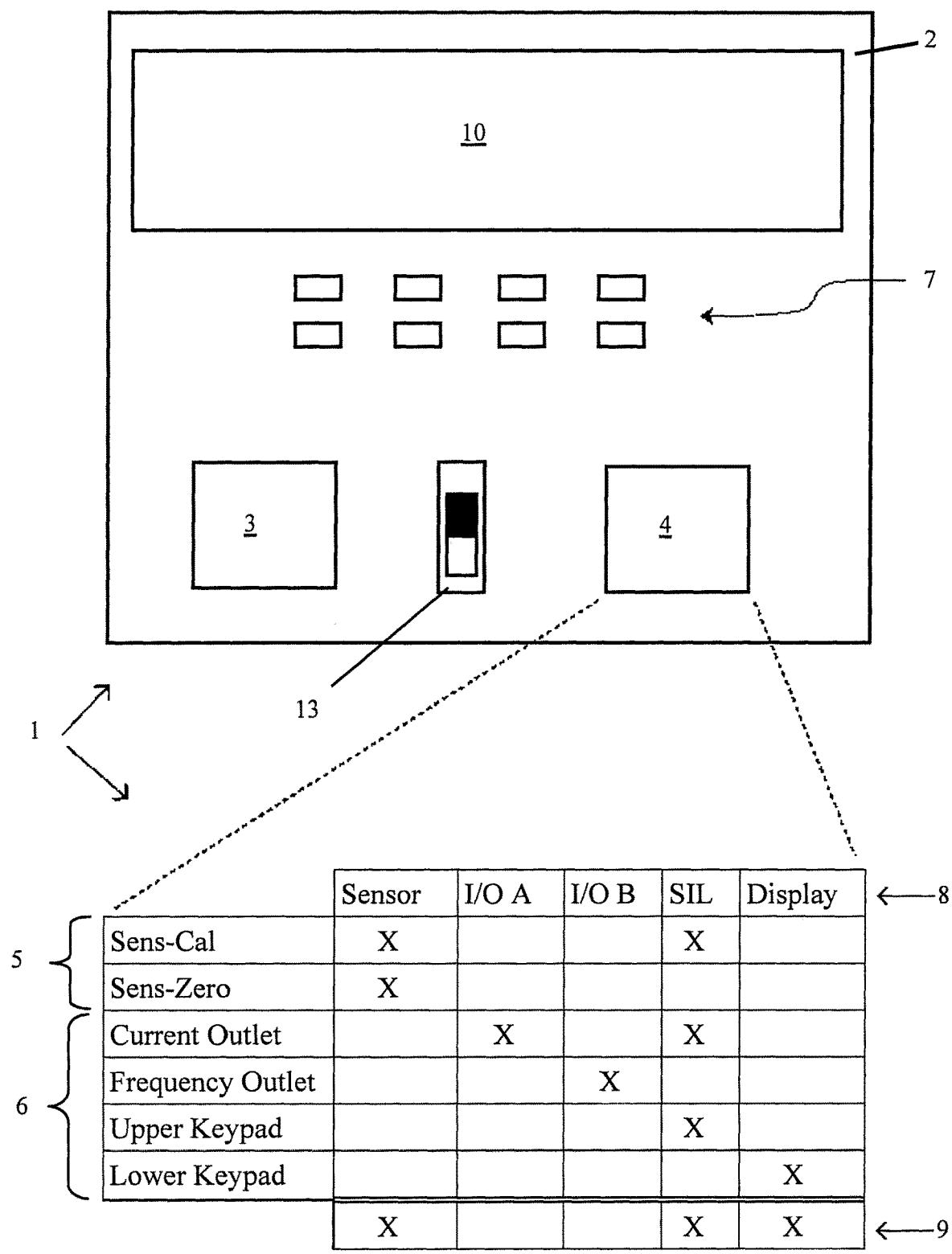

FIG. 1 shows a method 1 for configuration of a field device 2 for use in custody transfer, wherein the field device 2 has a computing unit 3 and a storage 4, wherein parameters 5 and functions 6 are stored in the storage 4, wherein the parameters 5 and the functions 6 can be at least partially configured.

It is shown symbolically in FIG. 1 that the parameters 5 and the functions 6 are listed in a chart, wherein the parameters 5 are general calibration parameters (sens-cal) as well as specific calibration parameters for the zero point (sens-zero). The functions are a current outlet, a frequency outlet and the configuration of a keypad 7, wherein the top line (upper keypad) and the bottom line (lower keypad) of the keypad 7 are provided as separate functions.

It can be seen in FIG. 1 that several blocking groups 8 are provided, presently the blocking groups 8 "sensor", "I/O A", "I/O B", "SIL" and "Display". Each blocking group 8 comprises at least one parameter 5 and/or at least one function 6 of the field device 2.

In the suggested method, at least one of the blocking groups 8 is chosen, in the present case, the blocking groups "sensor", "SIL" and "Display" are chosen. The chosen blocking groups 9 are evaluated by the computing unit 3, wherein the computing unit 3 blocks the parameters 5 and functions 6 contained in the chosen blocking groups 9 against a subsequent change.

In the embodiment according to FIG. 1, the blocking groups 8 are provided in the storage 4 of the field device 2. It is also possible that the blocking groups 8 are initially provided in the storage of a control unit to be connected to the field device, wherein a choice of the blocking groups then takes place via the display of the connected control unit.

It is shown in FIG. 2a that the blocking groups 8 of choice are shown on a display 10 of the field device 2. The selection takes place in the right column of the tabular list by making a mark (X). In FIG. 2b, on the other hand, it is shown that the blocking groups 8 can be chosen to be displayed by a display 11 of a control unit 12 to be connected to the field device 2.

A blocking element 13 is shown in FIG. 1, which, in this case, is a switch. The computing unit 3 evaluates the state of this blocking element 13 and the parameters 5 and/or functions 6 contained in the chosen blocking groups 9 are first blocked against a subsequent change in a defined blocking state of the blocking element 13. Furthermore, the computing unit 3 also blocks a change of the chosen blocking groups 9 after acknowledging the blocking state of the blocking element 13.

It can be clearly seen in FIGS. 1 and 2a, 2b that the blocking groups 8 are organized according to functional criteria and that at least one blocking group 8, which comprises the parameters 5 and/or functions 6 of one of the following areas: display, sensor, I/O-interface, safety functions (SIL), is among the blocking groups 8 to be chosen.

What is claimed is:

1. Method for the configuration of a field device for use in custody transfer, wherein the field device has a computing unit and a storage in which at least partially configurable parameters and/or functions are stored, comprising:
   providing at least two blocking groups organized according to functional criteria, wherein each of the at least two blocking groups comprises at least one blockable parameter and/or at least one blockable function of the field device for custody transfer,
   wherein each of the blocking groups comprises different choices of parameters and/or functions of custody transfer for providing flexibility in configuring the functions of the field device,
   selecting at least one of the at least two blocking groups by a user of the field device,
   evaluating with the computing unit the at least one blocking group selected, and
   blocking the at least one parameter and/or function contained in the selected at least one blocking group from being subsequently changed,
   wherein the blocking groups are provided in the storage of one of the field device and a control unit that is connectable to the field device,
   wherein the blocking groups are displayed and are selectable by the user of the field device using a display of one of the field device and the control unit, and
   wherein the computing unit evaluates the state of a blocking element of the field device and the computing unit first blocks the at least one parameter and/or function contained in the selected at least one of the blocking groups from being subsequently changed in a defined blocking state of the blocking element, so that a selection of parameters and/or functions for custody transfer is secured against manipulation occurring after blocking and wherein the parameters and/or functions of at least one of the at least two blocking groups that is unselected can, then, be subsequently influenced and configured for other functions of the field device.

2. Method according to claim 1, wherein the computing unit also blocks a change of the chosen blocking groups after acknowledging the blocking state of the blocking element.

3. Method according to claim 1, wherein the functional criteria according to which the blocking groups are organized comprise at least one parameter and/or function of one of the following areas: display, sensor, I/O-interface, safety functions, is among the blocking groups selected.

4. Method according to claim 1, wherein several blocking groups are combined in at least one higher-level blocking group and all blocking groups that are combined in the higher-level blocking group are selected by choosing the higher-level blocking group.

5. Field device for use in custody transfer, comprising:
   a computing unit and
   a storage, wherein parameters and/or functions for custody transfer that are at least partially configurable are stored in the storage,
   wherein at least two blocking groups are provided in the storage,
   wherein each of the at least two blocking groups comprises at least one blockable parameter and/or at least one blockable function of the field device and is selectable by a user,
   wherein each of the blocking groups comprises different choices of parameters and/or functions of custody transfer for providing flexibility in configuring the functions of the field device,
   wherein the computing unit is programmed to evaluate at least one selected blocking group and to block the at least one blockable parameter and/or the at least one blockable function contained in the at least one selected blocking group from being subsequently changed,
   wherein the storage is provided in the field device or in a control unit that is connectable to the field device,
   wherein a display on one of the field device and the control unit has means for indicating which of the blocking groups has been selected by the user of the field device, and
   wherein the computing unit has means for evaluating the state of a blocking element of the selected blocking group for first blocking the at least one blockable parameter and/or blockable function contained in the at least one selected blocking group against a subsequent change in a defined blocking state of the blocking element, so that a selection of parameters and/or functions for custody transfer is secured against manipulation occurring after blocking and wherein the blockable parameters and/or blockable functions of at least one of the at least two blocking groups that is unselected can, then, be subsequently influenced and configured for other functions of the field device.

6. Field device according to claim 5, wherein the computing unit also is adapted to block changing of the selected at least one of the blocking groups after acknowledging the blocking state of the blocking element.

7. Field device according to claim 5, wherein the blocking groups are organized according to functional criteria, wherein at least one blocking group, which comprises the parameters and/or functions of one of the following areas: display, sensor, I/O-interface, safety functions, is among the blocking groups available for selection.

8. Field device claim 5, wherein several blocking groups are combined into at least one higher-level blocking group and all blocking groups that are combined in the higher-level blocking group are selectable by choosing the higher-level blocking group.

* * * * *